United States Patent [19]
Hartshorn

[11] Patent Number: 4,570,666
[45] Date of Patent: Feb. 18, 1986

[54] UNIDIRECTIONAL, FLUID CONTROL VALVE

[75] Inventor: Kevin Hartshorn, Plainsboro, N.J.

[73] Assignee: Ingersoll-Rand Company, Woodcliff Lake, N.J.

[21] Appl. No.: 588,647

[22] Filed: Mar. 12, 1984

[51] Int. Cl.[4] ............................................. F16K 15/02
[52] U.S. Cl. ............................. 137/512.1; 137/512.2; 137/514; 137/516.11
[58] Field of Search ................... 137/512.1, 512.2, 514, 137/516.11–516.23

[56] References Cited

U.S. PATENT DOCUMENTS

| | | | |
|---|---|---|---|
| 2,186,489 | 1/1940 | Kehler | 137/516.13 |
| 3,369,563 | 2/1968 | Deminger | 137/512.1 X |
| 3,703,912 | 11/1972 | Bauer | 137/516.13 X |
| 3,820,561 | 6/1974 | Papst | 137/512.2 |
| 3,875,962 | 4/1975 | Bauer | 137/516.21 |
| 3,999,898 | 12/1976 | Chomczyk | 137/512.2 X |

FOREIGN PATENT DOCUMENTS 190328  2/1967  U.S.S.R. .......................... 137/512.2

Primary Examiner—Robert G. Nilson
Attorney, Agent, or Firm—B. J. Murphy

[57] ABSTRACT

In the first-depicted embodiment, the valve is of the ported, plate-type, having a ported valve seat, stop plate, a buffer plate, and a pair of valving elements. Stop pins extending from the stop plate restrict the lift of one of the ported valving elements to a lift dimension in which the flow coefficient provided thereby diminishes at a linear rate. The other ported valving element, carried by the first to the restricted limit of travel thereof, is free to continue its lift, in a valving function then, through a like valving lift dimension in which the flow coefficient which it affords also diminishes at a linear rate. Springs, interposed between the just-mentioned other valving element, and the stop plate, bias the valving elements in closure of the ports in the valve seat. The buffer plate, however, is supported in a non-contacting, speed-apart disposition relative to the seat, the stop, and the valving elements, and in a loose, independent, and unrestrained disposition relative to the stop and, therefore, is freely engageable with the stop.

6 Claims, 4 Drawing Figures

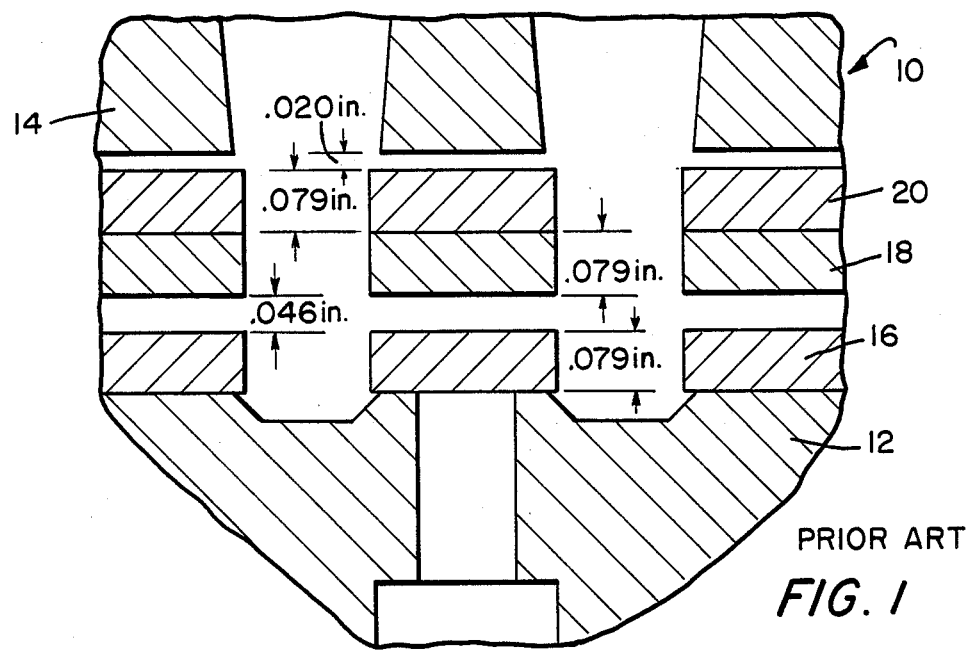
PRIOR ART
FIG. 1
FIG. 2
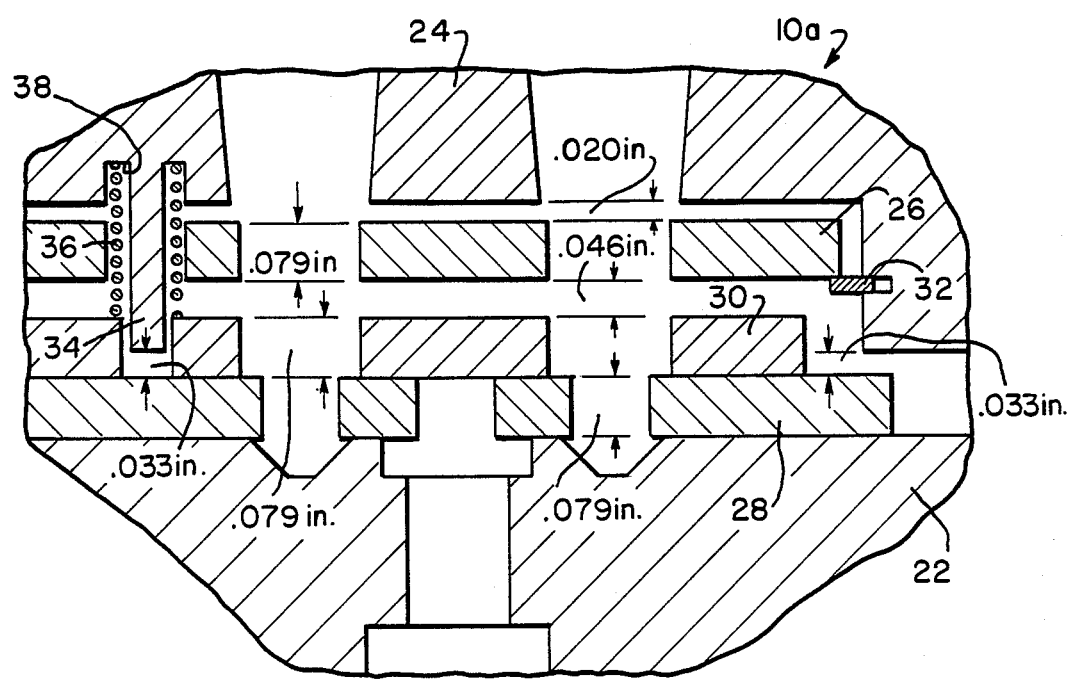

UNIDIRECTIONAL, FLUID CONTROL VALVE

This invention pertains to fluid control valves, such as those of the plate-type, used in reciprocating compressors for the compression of gases under a variety of flow and pressure conditions. These are essentially one-way devices in that flow may pass through them in only one direction. The valving element in such valves responds to pressure signals received from the compressor cylinder in combination with the inlet and discharge pressure conditions obtaining at a particular installation. Closing springs are typically used to assist in controlling the mass dynamics of the valving element and in opening and closing the valve at the proper time relative to the compressor cycle. Opening impact velocity is often dampened pneumatically, or by having the valving element contact a buffer plate. The overall assembly must be rugged and relatively easy to refurbish at a field installation or repair center.

Valve designs of the aforesaid type known in the prior art come in a variety of shapes and sizes. This disclosure refers to the aforesaid plate-type configuration for exemplary purposes, although the invention may be applied to a variety of geometries.

The valving element of a plate-type valve consists of a series of concentric rings which cover flow ports in the valve seat. The rings are connected by webbing which in turn is strengthened by thick radial ligaments. Air flow passes through the seat ports, around the concentric rings, and then through port openings in the valving element. Such prior art, plate-type valves commonly use one or two buffer plates to cushion impact of the valving element upon opening.

The flow efficiency of typical plate-type valve designs is strongly influenced by the flow area constraints dictated by the relationship between the valving element and seat, and the passageways in the valving element itself. Experiments show that, as the lift of a valving element increases, the flow efficiency of the valve decreases. Consequently, the effective flow area through the valve does not necessarily increase in direct proportion to valving element lift. High compressor speeds often require lower valving element lifts to avoid the damaging effects of excessive impact velocity. The valve designer must therefore sacrifice performance by using lower valving element lifts in order to achieve satisfactory valve life.

In the prior art, there are disclosures of plate-type valves in which the valving elements thereof are restricted to lower lifts, or stepped, or partial lifts. Typical thereof are U.S. Pat. No. 976,010, issued Nov. 15, 1910, to J. C. Thompson, for a "Valve", U.S. Pat. No. 919,036, issued to P. Langer, for a "Valve", on Apr. 20, 1909. and U.S. Pat. No. 1,668,342, for a "Valve", issued on May 1, 1928, to N. M. Small. In these prior teachings the valving element lifts are arbitrarily determined, or unspecified as to the lift dimension criteria. That is, it cannot be determined whether the valving element lifts are half normal lifts, thirds thereof, or each element performs a normal, full lift; neither is it explained what are the relevant criteria for valving element lift dimensions. The patentees do explain that the restricted valving element lifts, and a plurality of valving elements, are intended to decrease "slip", give quicker closure, provide for quick opening, accommodate easier closure with less shock, and/or to permit opening and closure with a minimum of pressure.

The prior art disclosures, and the objects or purposes sought thereby are certainly beneficial and worthy of practice. However, as stated earlier, the valve designer is faced with a seeming necessity to sacrifice valve performance by using such lower valving element lifts, or stepped or partial lifts. In reality, though, and as noted, flow efficiency is not directly proportional to valving element lift; flow coefficient is not uniform with valving element lift, in fact, as the lift increases the flow efficiency decreases and, toward the conclusion of a standard dimension lift, it decreases at an increasing rate of diminution or efficiency.

What has long been sought in this art, then, is a teaching which defines what is an optimum valving element lift, i.e., a lift which provides for a high flow coefficient, with all the other, aforenoted prior art objects or purposes, to yield a valve possessed of significant longevity.

Valve longevity has been identified as a requirement for a successful compressor installation. However, to achieve this, a valve must not lack efficiency and thus consume additional power cost due to horsepower losses. Thus, a high performance valve with excellent flow efficiency that lives under a variety of conditions is a desirable combination. It is an object of this invention to disclose a unidirectional, fluid control valve which embodies both these traits particularly by setting forth a valve of the aforesaid type having means for restricting valving element lift thereof to a lift which provides a preferred, high, flow coefficient.

It is an object of this invention to set forth a unidirectional, fluid control valve, comprising first means defining a valve seat having fluid ports formed therein; second means, coupled to said valve seat, defining a ported, valving element stop; third means, movably disposed between said seat and said stop, defining a plurality of ported, valving elements for engaging said seat to occlude said ports in said seat, and for lift thereof from said seat to expose said ports in said seat, thereby to prohibit, and to permit, fluid flow through said ports in said seat, respectively; and fourth means, interposed between said third means and one of said first and second means, defining a ported, valving element buffer; wherein said seat and said stop have mutually confronting surfaces; said surfaces are spaced apart a first, fixed dimension measured along a plane lying normal to said surface; said valving elements and said buffer together occupy a given portion of said first, fixed dimension; and that which (a) remains of said first, fixed dimension, and (b) is devoid of said valving elements and said buffer, defines free space within said control valve in which to accommodate valving element lift from said seat towards said stop; wherein said free space defines a total, valve lift-accommodating dimension, then, which is said first, fixed dimension less said given portion which is occupied, as aforesaid, by said valving elements and said buffer; and one of said first and second means has means for restricting lift of one of said valving elements, toward said stop, to (a) a fraction of said lift-accommodating dimension, and (b) a lift in which, as a consequence thereof, the flow coefficient of fluid permitted to flow through said ports in said seat diminishes only at a substantially linear rate.

It is also an object of this invention to disclose a unidirectional, fluid flow valve, comprising first means defining a valve seat having fluid ports formed therein; second means, coupled to said valve seat, defining a ported, valving element stop; and a third means, movably disposed between said seat and said stop, defining a plurality of ported, valving elements for engaging said seat to occlude said ports in said seat, and for lift thereof from said seat to expose said ports in said seat, thereby to prohibit, and to permit, fluid flow through said ports in said seat, respectively; and wherein said seat and said stop have mutually confronting surfaces; said surfaces are spaced apart a first, fixed dimension measured along a plane lying normal to said surfaces; said valving elements occupy a given portion of said first, fixed dimension; and that which (a) remains of said first, fixed dimension, and (b) is devoid of said valving elements, defines free space within said control valve in which to accommodate valving element lift from said seat towards said stop; wherein said free space defines a total, valve lift-accommodating dimension, then, which is said first, fixed dimension less said given portion which is occupied, as aforesaid, by said valving elements; and one of said first and second means has means for restricting lift of one of said valving elements, toward said stop, to (a) a fraction of said lift-accommodating dimension, and (b) a lift in which, as a consequence thereof, the flow coefficient of fluid permitted to flow through said ports in said seat diminishes only at a substantially linear rate.

It is yet another object of this invention to set forth a unidirectional, fluid control valve, comprising a first means defining a valve seat having fluid ports formed therein; second means, coupled to said valve seat, defining a ported, valving element stop; third means, movably disposed between said seat and said stop, defining a plurality of ported, valving elements for engaging said seat to occlude said ports in said seat, and for lift thereof from said seat to expose said ports in said seat, thereby to prohibit, and to permit, fluid flow through said ports in said seat, respectively; and fourth means, interposed between said third means and said second means, defining a ported, valving element buffer plate; wherein said seat and said stop have mutually confronting surfaces; and further including retaining means, coupled to one of said first and second means, for supporting said buffer plate within said valve in a non-contacting, spaced-apart disposition relative to said seat, said stop, and said valving elements, and further in a loose, independent and unrestrained disposition, relative to said stop, whereby said buffer plate is freely engageable with said stop; wherein said confronting surfaces are spaced apart a first, fixed dimension; said valving element and said buffer plate are spaced apart a given distance therebetween, but together occupy a given portion of said first, fixed dimension; and that which (a) remains of said first, fixed dimension, and (b) is devoid of said valving elements and said buffer plate, defines free space within said control valve in which to accommodate valving element lift from said seat towards said stop; wherein said free space defines a total, valve lift-accommodating dimension, then, which is said first, fixed dimension less said given portion which is occupied, as aforesaid, by said valving elements and said buffer plate; and one of said first and second means has means for restricting lift of one of said valving elements, toward said stop to (a) a fraction of said lift-accommodating dimension, (b) a lift in which, as a consequence thereof, the flow coefficient of fluid permitted to flow through said ports in said seat diminishes only at a substantially linear rate, and (c) a lift which permits movement of said one valving element, toward said buffer plate, only a specified distance which is less than said given distance.

Further objects of this invention, as well as the novel features thereof, will become more apparent by reference to the following description taken in conjunction with the accompanying figures, in which:

FIG. 1 is a partial, cross-sectional view of a prior art, plate-type, unidirectional, fluid control valve;

FIG. 2 is a view similar to that of FIG. 1 depicting a first embodiment of the invention;

Figure 3:
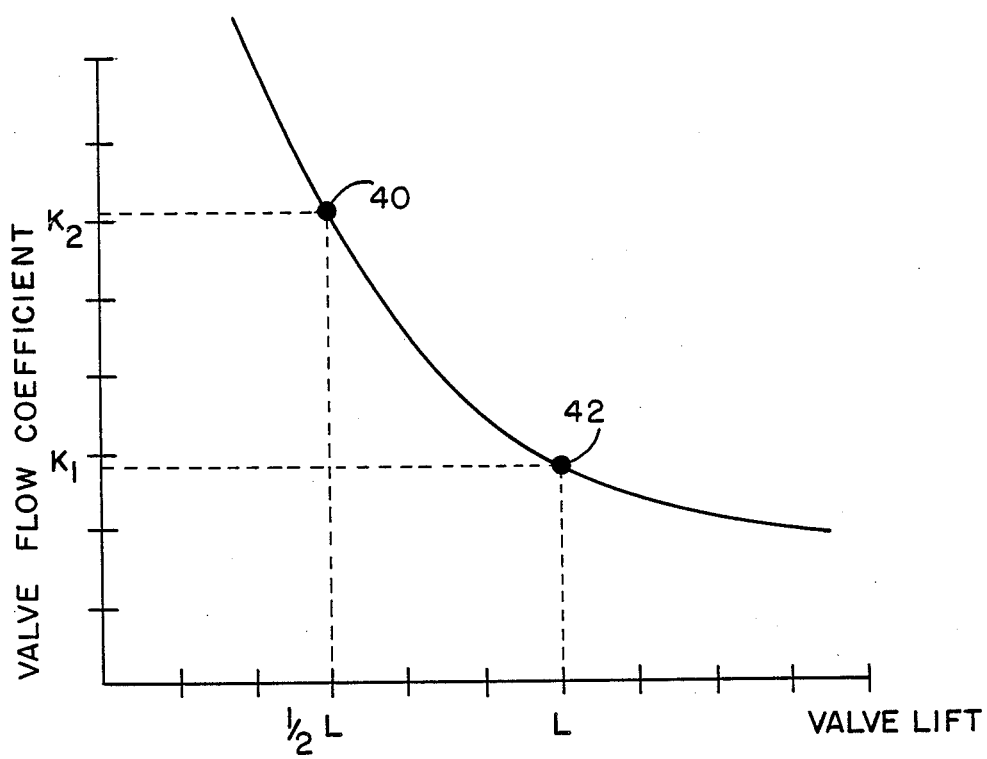
FIG. 3 is a plot of valve flow coefficient vis-a-vis valving element lift.

As shown in FIG. 1, a prior art, plate-type, unidirectional, fluid control valve 10 comprises a ported valve seat 12, a ported stop guard or stop plate 14, the two being held in spaced-apart disposition (by means not shown), and a ported valving element 16, first buffer plate 18, and a second buffer plate 20. Means (not shown) support the buffer plates 18 and 20, according to well known practices, in spaced-apart dispositions relative to the valve seat 12 and the stop plate 14. The buffer plates may be supported in the manner disclosed in U.S. Pat. No. 3,875,962, issued on Apr. 8, 1975, to Bauer et al, for "A Resilient System for Multi-Ring Compressor Valves", or as set forth in U.S. Pat. No. 3,703,912, issued on Nov. 28, 1972, to Bauer et al, for a "Plate Valve."

This valve 10 accommodates for a lift of the valving element 16 through a distance of 0.066-inch. There obtains a vertical space of 0.046-inch in depth between the valving element 16 and the first buffer plate 18, and another vertical space of 0.020-inch in depth between the second buffer plate 20 and the step plate 14. Upon opening, the valving element 16 travels through the initial 0.046-inch distance until it engages the first buffer plate 18; then it, and both buffer plates 18 and 20, travel together through the remaining 0.020-inch distance until the second buffer plate 20 engages the stop plate 14.

For the purpose of this disclosure, the 0.066-inch valve lift distance shall be considered a flull, standard valve lift dimension.

A first embodiment of my invention is illustrated in FIG. 2 where a valve 10a also has a ported valve seat 22, a ported stop plate 24, a single, ported buffer plate 26, and two, ported valving elements 28 and 30. A retainer 32 supports the buffer plate 26 in suspension above valving element 30, a distance of 0.046-inch, and spaced-apart from the stop plate 24 a distance of 0.020-inch.

Clearly, the aforesaid, same 0.066-inch valve lift dimension is provided, in valve 10a. However, my novel improvement restricts the lift of valving element 28 to a fraction of the 0.066-inch dimension.

Projecting from the stop plate 24 are a plurality of stop pins 34 (only one is shown). The pins 34 terminate 0.033-inch away from the closed valving element 28. Thus, on opening, the valving element is limited in the lift thereof to the latter, dimensional distance. Too, on opening, element 28 will carry element 30 the same, aforesaid 0.033-inch distance; element 30, at that time, reposes a distance of 0.013-inch from buffer plate 26. Responsive to the fluid pressure, element 30 will continue to lift until it engages the buffer plate 26 and carries the latter through the remaining distance (of 0.020-inch) to an engagement with the stop plate 24. It is to be noted that the buffer plate 26 is supported in suspension, as cited, by retainer 32, above the valving element 30. In fact, the buffer plate is supported in a non-contacting, spaced-apart disposition between valving element 30 and the stop plate 24. It is in a loose, independent and unrestrained disposition, relative to the stop plate, and is freely engageable with the stop plate 24, therefore. The opening force of the valve, then, is initially absorbed solely by the unrestrained, suspended buffer plate 26.

Springs 36, circumjacent the pins 34, only one of which is shown, bias the valving elements 28 and 30 in the closed position. The springs 36 bear against element 30, are in penetration of the buffer plate 26, and react from annular recesses 38 (only one is shown) formed in the stop plate 24.

Each valving element 28 and 30 manifests a valving lift which is half the aforesaid, full, standard, valve lift dimension of 0.066-inch. However, this is only exemplary. The valving element lifts, according to my teaching, are not necessarily a half of a standard lift, or a third, or a quarter, etc. In the depicted embodiment of valve 10a, the half-lift dimensions are warranted, in view of the relevant parameters of the valve 10a, to wit: the porting dimensions, the number of ports, the bias of the springs 36, and the like, in that such half-lifts provide a high flow coefficient for such parameters.

For valve 10a, or for any given valve of a similar kind, a plot of the flow coefficient vis-a-vis valving element lift will show that full, standard valving element lift is not efficiently productive or, to state it another way, valving element lift beyond some given percentage of an available lift dimension manifests a diminishing flow coefficient which diminishes at an increasing rate of increase. At some point along such a plot, the track of flow coefficiency departs from a substantial linearity to an arcing, flattening curve.

FIG. 3 depicts such a plot for the valve 10a of FIG. 2, for instance, albeit typical (as priorly suggested) for any like valve. It will be self-evident that the flow coefficient $K_2$ is markedly superior to that of $K_1$. Now then, valve lift "½ L" corresponds to the 0.033-inch valving lifts to which the valving elements 28 and 30 are limited, and valve lift "L" corresponds to the 0.066-inch valving lift of valving element 16 (FIG. 1). It is clearly to be seen that the flow coefficient thereof rapidly attenuates with its full lift.

It is my teaching that valving element lift must be limited to that dimension which provides a flow coefficient taken any where along the substantially linear track of the plot (FIG. 3) to point 40, and not be permitted to exhibit lift through dimensions which provide the flow coefficients obtaining between points 40 and 42 along the track of the plot. For the aforesaid parameters of the valve 10a, the half lifts, "½ L", of elements 28 and 30 yield the coefficient $K_2$. For other parameters, comprising different numbers of ports in elements 28 and 30, or differing port sizes, etc., lifts of two-fifths and three-fifths (of a standard, valve lift dimension), respectively, or vice versa may be warranted to achieve a coefficient of $K_2$. For different valves, then, and varying numbers and sizes of ports, and two, three or more valving elements, the optimum valving element lift(s), to achieve a high flow coefficient corresponding to the linear track of the plot (FIG. 3), must be determined empirically.

Figure 4:
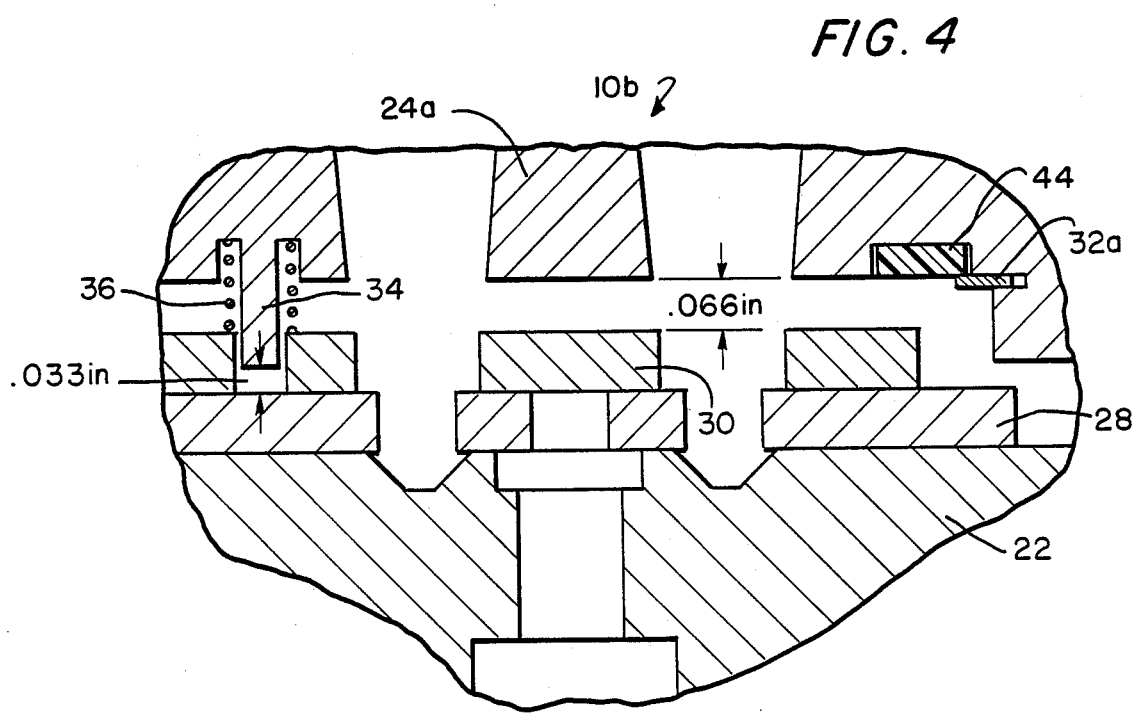
FIG. 4 is a view similar to that of FIG. 2 depicting a second embodiment of the invention.

The embodiment of FIG. 2 comprises the buffer plate 26. Now, it is feasible to practice just the lift-restricting portion of the invention in a valve design which has no buffer plate. Such an alternative embodiment is shown in FIG. 4.

Valve 10b has the same valve seat 22, valving elements 28 and 30 and a similar stop plate 24a, as well as the stop pins 34 and springs 36, as has valve 10a. It lacks a buffer plate, however, having instead an impact ring 44 held in place by a retainer 32a. The valve lift distance, in sum, is still 0.066-inch, but each element makes a valving lift of 0.033-inch to manifest the flow coefficient $K_2$ (FIG. 3) for each.

The invention, particularly as depicted in the embodiment of valve 10a, has associated with it lower impact velocities since the valving element lift has been reduced compared to that of the single plate approach. Lower impact velocities result in lower stresses and therefore longer valving element life.

Another feature of the invention is the use of valving element 28 as a buffer for valving element 30 during closure. Valving element 30 uses the closing springs 36 which cause it to begin closing before element 28. Element 30 will contact element 28 at some velocity and both will continue on to final closure at the valve seat 22. The closing velocity is less than the impact velocity that would be seen by element 30 closing alone. A single buffer plate 26 is also employed by element 30 during the opening process. Valve plate impact is consequently damped for element 30 in both directions. Element 28 does not require the same damping action since its relative lift is less than element 30.

While I have described my invention in connection with specific embodiments thereof, it is to be clearly understood that this is done only by way of example and not as a limitation to the scope of my invention as set forth in the objects thereof and in the appended claims.

I claim:

1. A unidirectional, fluid control valve, comprising:
   first means defining a valve seat having fluid ports formed therein;
   second means, coupled to said valve seat, defining a ported, valving element stop;
   third means, movably disposed between said seat and said stop, defining a plurality of ported, valving elements for engaging said seat to occlude said ports in said seat, and for lift thereof from said seat to expose said ports in said seat, thereby to prohibit, and to permit, fluid flow through said ports in said seat, respectively; and
   fourth means, interposed between said third means and said second means, defining a ported, valving element buffer plate; wherein
   said seat and said stop have mutually confronting surfaces; and further including
   retaining means, coupled to one of said first and second means, for supporting said buffer plate within said valve in a non-contacting, spaced-apart disposition relative to said seat, said stop, and said valving elements, and further in a loose, independent and unrestrained disposition, relative to said stop, whereby said buffer plate is freely engageable with said stop; wherein
   said confronting surfaces are spaced apart a first, fixed dimension;
   said valving elements and said buffer plate are spaced apart a given distance therebetween, but together occupy a given portion of said first, fixed dimension; and
   that which (a) remains of said first, fixed dimension, and (b) is devoid of said valving elements and said buffer plate, defines free space within said control valve in which to accommodate valving element lift from said seat towards said stop; wherein said free space defines a total, valve lift-accommodating dimension, then, which is said first, fixed dimension less said given portion which is occupied, as aforesaid, by said valving elements and said buffer plate; and one of said first and second means has means for restricting lift of one of said valving element, toward said stop, to (a) a fraction of said lift-accommodating dimension, (b) a lift in which, as a consequence thereof, the flow coefficient of fluid permitted to flow through said ports in said seat diminishes only at a substantially linear rate, and (c) a lift which permits movement of said one valving element, toward said buffer plate, only a specified distance which is less than said given distance.

2. A unidirectional, fluid control valve, according to claim 1, wherein:

said lift-restricting means comprises means coupled to, and projecting from said stop.

3. A unidirectional, fluid control valve, comprising:

first means defining a valve seat having fluid ports formed therein;

second means, coupled to said valve seat, defining a ported, valving element stop;

third means, movably disposed between said seat and said stop, defining a plurality of ported, valving elements for engaging said seat to occlude said ports in said seat, and for lift thereof from said seat to expose said ports in said seat, thereby to prohibit, and to permit, fluid flow through said ports in said seat, respectively; and fourth means, interposed between said third means and said second means, defining a ported, valving element buffer plate; wherein said seat and said stop have mutually confronting surfaces; and further including retaining means, coupled to one of said first and second means, for supporting said buffer plate within said valve in a non-contacting, spaced-apart disposition relative to said seat, said stop, and said valving elements, and further in a loose, independent and unrestrained disposition, relative to said stop, whereby said buffer plate is freely engageable with said stop; wherein said confronting surfaces are spaced apart a first, fixed dimension;

said valving elements and said buffer plate are spaced apart a given distance therebetween, but together occupy a given portion of said first, fixed dimension; and that which (a) remains of said first, fixed dimension, and (b) is devoid of said valving elements and said buffer plate, defines free space within said control valve in which to accommodate valving element lift from said seat towards said stop; wherein said free space defines a total, valve lift-accommodating dimension, then, which is said first, fixed dimension less said given portion which is occupied, and aforesaid, by said valving elements and said buffer plate; and one of said first and second means has means for restricting lift of one of said valving elements, toward said stop, to (a) a fraction of said lift-accommodating dimension, (b) a lift in which, as a consequence thereof, the flow coefficient of fluid permitted to flow through said ports in said seat diminishes only at a substantially linear rate, and (c) a lift which permits movement of said one valving element, toward said buffer plate, only a specified distance which is less than said given distance, and further including means interposed between, and engaging, said stop and another of said valving elements of said plurality thereof for resiliently restraining said another valving element against movement.

4. A unidirectional, fluid control valve, comprising:

first means defining a valve seat having fluid ports formed therein;

second means, coupled to said valve seat, defining a ported, valving element stop;

third means, movably disposed between said seat and said stop, defining a plurality of ported, valving elements for engaging said seat to occlude said ports in said seat, and for lift thereof from said seat to expose said ports in said seat, thereby to prohibit, and to permit, fluid flow through said ports in said seat, respectively; and fourth means, interposed between said third means and said second means, defining a ported, valving element buffer plate; wherein said seat and said stop have mutually confronting surfaces; and further including retaining means, coupled to one of said first and second means, for supporting said buffer plate within said valve in a non-contacting spaced-apart disposition relative to said seat, said stop, and said valving elements, and further in a loose, independent and unrestrained disposition, relative to said stop, whereby said buffer plate is freely engageable with said stop; wherein said confronting surfaces are spaced apart a first, fixed dimension;

said valving elements and said buffer plate are spaced apart a given distance therebetween, but together occupy a given portion of said first, fixed dimension; and that which (a) remains of said first, fixed dimension, and (b) is devoid of said valving elements and said buffer plate, defines free space within said control valve in which to accommodate valving element lift from said seat towards said stop; wherein said free space defines a total, valve lift-accommodating dimension, then, which is said first, fixed dimension less said given portion which is occupied, as aforesaid, by said valving elements and said buffer plate; and one of said first and second means has means for restricting lift of one of said valving elements, toward said, stop, to (a) a fraction of said lift-accommodating dimension, and (b) a lift in which, as a consequence thereof, the flow coefficient of fluid permitted to flow through said ports in said seat diminishes only at a substantially linear rate, and (c) a lift which permits movement of said one valving element, toward said buffer plate, only a specified distance which is less than said given distance; further including means interposed between, an engaging, said stop and another of said valving elements of said plurality thereof for resiliently restraining said another valving element against movement; and wherein said lift-restricting means intrudes into said another valving means.

5. A unidirectional, fluid control valve, comprising:

first means defining a valve seat having fluid ports formed therein;

second means, coupled to said valve seat defining a ported, valving element stop;

third means, movably disposed between said seat and said stop, defining a plurality of ported, valving elements for engaging said seat to occlude said ports in said seat, and for lift thereof from said seat to expose said ports in said seat, thereby to prohibit, and to permit, fluid flow through said ports in said seat, respectively; and fourth means, interposed between said third means and said second means, defining a ported, valving element buffer plate; wherein said seat and said stop have mutually confronting surfaces; and further including retaining means, coupled to one of said first and second means, for supporting said buffer plate within said valve in a non-contacting, spaced-apart disposition relative to said seat, said stop, and said valving elements, and further in a loose, independent and unrestrained disposition, relative to said stop, whereby said buffer plate is freely engageable with said stop; wherein said confronting surfaces are spaced apart a first, fixed dimension;

said valving elements and said buffer plate are spaced apart a given distance therebetween, but together occupy a given portion of said first, fixed dimension; and that which (a) remains of said first, fixed dimension, and (b) is devoid of said valving elements and said buffer plate, defines free space within said control valve in which to accommodate valving element lift from said seat towards said stop; wherein said free space defines a total, valve lift-accommodating dimension, then, which is said first, fixed dimension less said given portion which is occupied, as aforesaid, by said valving elements and said buffer plate; and one of said first and second means has means for restricting lift of one of said valving elements, toward said stop, to (a) a fraction of said lift-accommodating dimension, and (b) a lift in which, as a consequence thereof, the flow coefficient of fluid permitted to flow through said ports in said seat diminishes only at a substantially linear rate, and (c) a lift which permits movement of said one valving element, toward said buffer plate, only a specified distance which is less than said given distance; further including means interposed between, and engaging, said stop and another of said valving elements of said plurality thereof for resiliently restraining said another valving element against movement; and wherein said left-restricting means comprising pins fixed in, and projecting from, said stop; and said restraining means comprises compression springs arranged circumjacent said pins.

6. A unidirectional, fluid control valve, comprising:

first means defining a valve seat having fluid ports formed therein;

said means, coupled to said valve seat, defining a ported, valving element stop;

third means, movably disposed between said seat and said stop, defining a plurality of ported, valving elements for engaging said seat to occlude said ports in said seat, and for lift thereof from said seat to expose said ports in said seat, thereby to prohibit, and to permit, fluid flow through said ports in said seat, respectively; and fourth means, interposed between said third means and one of said first and second means, defining a ported, valving element buffer; wherein said seat and said stop have mutually confronting surfaces;

said surfaces are spaced apart a first, fixed dimension measured along a plane lying normal to said surface;

said valving elements and said buffer together occupy a given portion of said first, fixed dimension; and that which (a) remains of said first, fixed dimension, and (b) is devoid of said valving elements and said buffer, defines free space within said control valve in which to accommodate valving element lift from said seat towards said stop; wherein said free space defines a total, valve lift-accommodating dimension, then, which is said first, fixed dimension less said given portion which is occupied, as aforesaid, by said valving elements and said buffer;

one of said first and second means has means for restricting lift of one of said valving element, toward said stop, to (a) a fraction of said lift-accommodating dimension, and (b) a lift in which, as a consequence thereof, the flow coefficient of fluid permitted to flow through said ports in said seat diminishes only at a substantially linear rate, and said lift-restricting means penetrates said ported, valving element buffer.

* * * * *